Patented Aug. 3, 1954

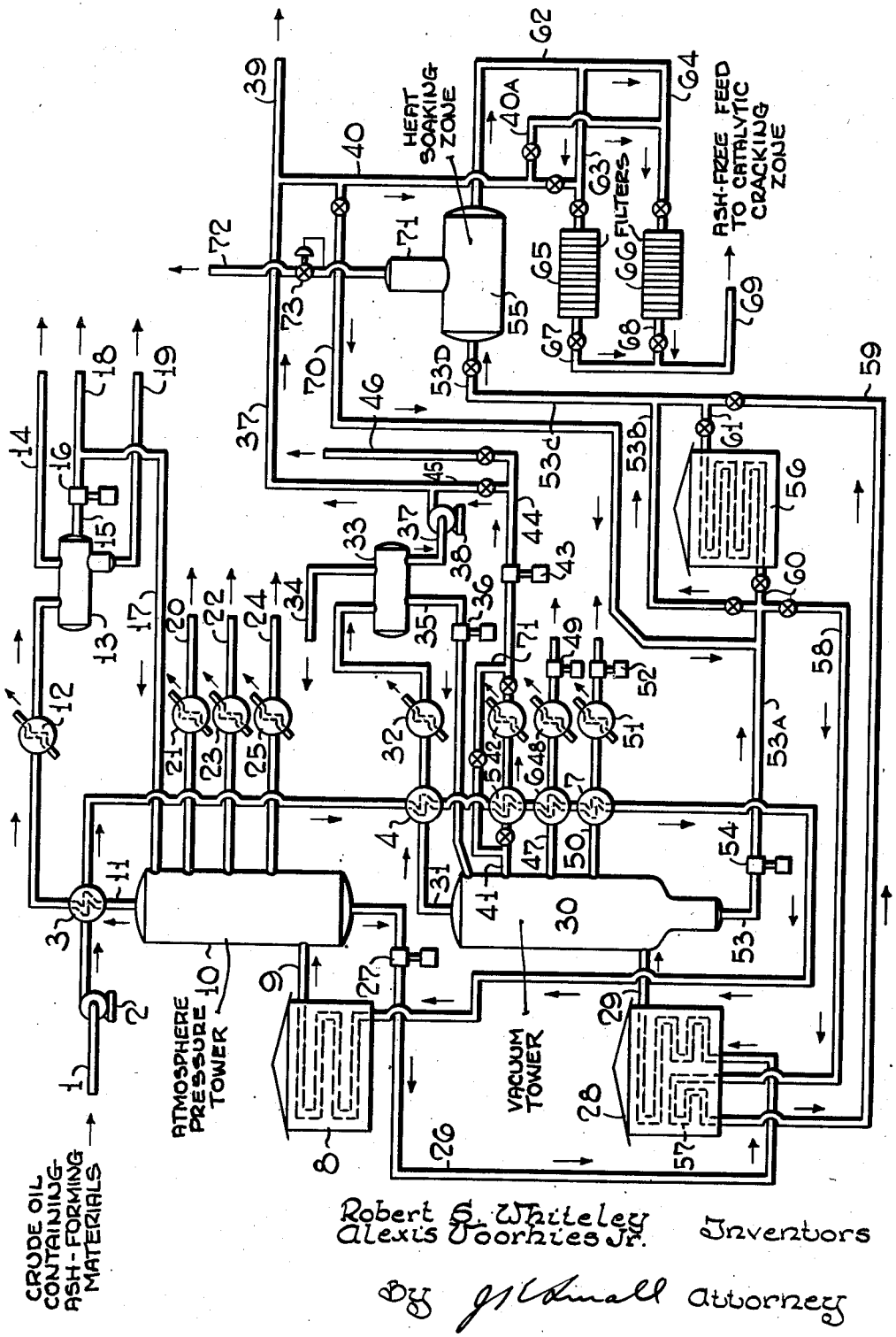

2,685,561

UNITED STATES PATENT OFFICE 2,685,561

DEASHING OF REDUCED CRUDES BY AN INTEGRATED OPERATION

Robert S. Whiteley and Alexis Voorhies, Jr., Baton Rouge, La., assignors to Standard Oil Development Company, a corporation of Delaware Application March 16, 1951, Serial No. 216,041

7 Claims. (Cl. 196—71)

The present invention is broadly concerned with the de-ashing of reduced petroleum crude oils by an integrated operation including a pipe still. The invention is more particularly concerned with the preparation of a crude residuum feed stock which can be satisfactorily catalytically cracked without harm to the cracking catalyst. In accordance with the present invention the bottoms fraction of a reduced crude, while still hot, is heat soaked and filtered to remove ash converted from a soluble to insoluble form by heat soaking. The filtering operation is improved by washing the filter employing a solvent stream preferably from the pipe still in which the crude was reduced, and preferably a solvent stream which would normally comprise a portion of the feed to a catalytic cracking plant. This stream can be diverted through the heat soaking equipment and then conveyed to the cracking plant without loss either in quantity or quality as a catalytic cracking feed stock. Any of the de-ashed residue that was soluble in the solvent stream would simply serve as an additional feed to the catalytic cracking unit.

It is well known in the art that crudes contain ash materials which normally comprise such substances as sodium, silica, iron, calcium, magnesium, nickel and vanadium. It is also known that these ash constituents are soluble and that in many instances they can be concentrated in an insoluble form which tends to concentrate in the heavier fractions upon fractionation of the crudes. It is also known that when the heavy petroleum fractions are employed in a fluidized catalytic cracking process the ash constituents harm the cracking catalyst by acting as poisons. The fluidized solids technique for processing feed fractions, as for example, heavy residuums and petroleum hydrocarbons, and for carrying out other chemical reactions, is a conventional one. The system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional and will not be described.

As pointed out above, one problem encountered when employing a heavy residuum from various crudes is that the residuum contains ash constituents which constituents tend to poison the catalytic cracking operation necessitating the removal and replacement of the catalyst at more frequent intervals than is normally practiced when using clean feed stocks. In accordance with the present invention the bottoms fraction of a reduced crude, while still hot is heat soaked and filtered to convert the ash from a soluble to an insoluble form. Further in accordance with this invention the filter operation for the removal of the insoluble ash constituents is much improved by washing the filter by means of a solvent stream from the pipe still in which the crude was reduced. By this means a greater recovery of useful heavy residuum catalytic cracking feed stock is effected.

The process of the present invention may be readily understood by reference to the drawing illustrating one embodiment of the same. Referring specifically to the drawing a crude oil is introduced into the system through feed line 1 by means of pump 2. This crude oil is preferably preheated by heat exchange with the overhead stream from an atmospheric pressure fractionating tower 10 and with the side and overhead streams from a vacuum fractionating tower 30 by passing through heat exchanger units 3, 4, 5, 6 and 7. The preheated crude is then further heated to the desired fractionating temperature in furnace 8 and then introduced into atmospheric pressure fractionating tower 10 by means of line 9. Temperatures and pressures in zone 10 are adjusted to secure the desired hydrocarbon fractions. The pressure in the top section of zone 10 is substantially atmospheric but may be as high as 5 to 10 pounds per sq. in. gauge. A vapor stream is removed overhead from zone 10 by means of line 11, partially cooled in heat exchanger 3, further cooled in cooling zone 12 and then introduced into a separation zone 13 wherein liquid condensate is segregated from uncondensed vapors. Hydrocarbon vapors which cannot be condensed at atmospheric temperature and pressure are removed from separation zone 13 by means of line 14. A light naphtha fraction boiling in the range of about 100° F. to 300° F. is removed from zone 13 through line 15 by means of pump 16. Suitable automatically operated instruments, not shown, are provided to effect a split in the stream being discharged from pump 16. A portion of the light naphtha is recycled by line 17 to the top of tower 10 in order to control the tower temperature and to aid in the fractionation of the crude. A second portion of the light naphtha fraction from separator 13 is withdrawn by means of line 18 to another refinery unit for further processing. Normally there is some water in the crude entering through line 1. This water is separated from the hydrocarbons in zone 13 and is removed from the system through line 19. A heavy naphtha fraction boiling in the range from about 200° F. to 430° F. is removed from tower 10, as a side stream, by means of line 20, cooled in cooling zone 21 and then transferred to storage or handled in any manner desirable. An intermediate boiling fraction, as for example, a fraction boiling in the range of 340° F. to 480° F. may be segregated by means of line 22, cooled in cooling zone 23 and then handled in any manner desirable. A third side fraction boiling in the range from about 450° F. to 570° F. is segregated by means of line 24, cooled in cooling zone 25 and then further refined or handled as desired.

A bottoms stream from atmospheric pressure fractionating tower 10 is removed by means of line 26 and pump 27 and further heated in furnace 28. Thereafter it is introduced into a vacuum fractionating tower 30 by means of line 29. In accordance with the preferred embodiment of the invention, this bottoms stream removed from zone 10 may comprise from about 25% to 75% by volume based upon the crude fed by means of lines 1 and 9 to zone 10. This bottoms fraction is preferably separated in vacuum tower 30 into gas oil fractions boiling in the range from 400° F. IBP to 90% off at 1050° F. (as determined by Engler distillation) and various distillate fractions, the boiling range of which may be controlled as desired by adjusting temperatures and pressures on unit 30.

A light gas oil fraction boiling in the range of about 400° F. to 675° F. is removed overhead from vacuum tower 30 by means of line 31, passed through heat exchanger zone 4, cooled in cooling zone 32 and then introduced into a separation zone 33. Gaseous constituents are removed overhead from zone 33 by means of line 34 to vacuum pumps, not shown, which maintain zone 30 at a sub-atmospheric pressure. Some of the light gas oil is removed from separation zone 33 by means of line 35 and recycled to zone 30 by means of pump 36. The light gas oil flowing through line 35 aids in controlling the temperature within tower 30 and in the separation of the bottoms product from zone 10 into gas oil and other desirable petroleum fractions. The remainder of the light gas oil is removed from zone 33 through line 37 by means of pump 38. This stream is particularly suitable as a catalytic cracking process and may be poured directly by means of line 39 to the catalytic cracking operation, but in accordance with this invention at least a portion of this stream is segregated by means of line 40 and utilized as hereinafter described.

A heavy gas oil fraction boiling in the range of 530° F. to 90% off at 850° F. (Engler) is removed from tower 30 through line 41 by means of pump 43, cooled by indirect heat exchange with the crude feed in exchanger 5, further cooled in zone 42 and then transferred by means of lines 44 and 45 into the stream flowing in line 37 where it becomes a portion of the catalytic cracking feed stock.

However, this stream may be finished in any other desirable manner, for which purpose it may be removed by line 46. Intermediate boiling distillates may be removed from zone 30 by means of lines 47 and 50. If desired the distillate in line 47 may be cooled in zones 6 and 48 and transferred by means of pump 49 to another refining operation. Likewise the distillate in line 50 may be cooled in zones 7 and 51 and transferred by means of pump 52 to another refining operation.

In accordance with the present invention, the bottoms fraction from vacuum tower 30 is removed through line 53 by means of pump 54 and transferred through lines 53A, 53B, 53C and 53D into heat soaking zone 55. The quantity of bottoms varies between 2% and 35 volume per cent of the crude feed to furnace 8, the exact quantity depending upon the composition of the crude. Prior to introducing the residuum removed by means of line 53 from tower 30 into the soaking zone 55 it may be desirable to further heat this stream to a higher temperature in furnace 56. In this event the flow of residuum from zone 30 would be through lines 53A, 60, 61, 53C and 53D into heat soaking zone 55. Under certain conditions, it may be desirable to employ a second coil 57 in furnace 28 rather than to utilize furnace 56. For example, when it is desirable to raise the temperature of the residuum from tower 30 by about 50° F. it may be desirable to use heating coil 57 rather than construct the more expensive furnace 56. Under these conditions the residuum is circulated through coil 57 in furnace 28 by introducing residuum from line 53A into line 58 and thence into coil 57. The residuum is withdrawn from coil 57 through lines 59 and passed through lines 59, 53C, 53D into heat soaking zone 55.

After a sufficient soaking operation, the residuum is withdrawn from heat soaking zone 55 by means of lines 62 and 63 and passed through filter 65 or through lines 62 and 64 through filter 66 which for the purpose of illustration are assumed to be plate and frame filters. Insoluble ash constituents are removed from the residuum in zones 65 and 66 rendering the residuum a satisfactory feed stock for catalytic cracking. The residuum is removed through either lines 67 or line 68 and passed through line 69 to a catalytic cracking zone as hereinbefore described.

In accordance with the present invention, at least a portion of the gas oil stream segregated by means of lines 40 and 40A is introduced into filters 65 and 66 at periodic intervals in order to maintain the filters at a high rate of efficiency. Alternatively the gas oil may be added to the residuum being filtered to flux the asphaltic constituents and prevent their building up in the filter. It is also within the concept of the present invention to introduce a portion of this gas oil by means of line 70 into the residuum as it passes through line 53A in order that it may be reheated in combination with the residuum in either furnace 56 or coil 57 in furnace 28 if desired. In the event that additional heating of the combined residuum and gas oil stream is necessary the exchanger 5 and cooler 42 in line 41 may be by-passed by means of line 71. The heat soaking operation may be carried out at either atmospheric or at super-atmospheric pressures, preferably in the range of between 200 and 500 pounds per square inch gauge. It is possible with a long time of soaking in the high temperature range of the operation to partially crack the residuum to lighter constituents. In the event that the pressure in the heat soaking operation should begin to rise because of the formation of vaporized light constituents, the vapors are collected in zone 71, which is attached to zone 55, and released through line 72 and automatic pressure regulating valve 73. The light hydrocarbons leaving through line 72 are then cooled and handled in any desirable manner.

The invention is broadly concerned with the de-ashing of reduced crude as an operation integrated with the operation of a pipe still in which residuum is separated from the other constituents of crude petroleum oil. The invention is more particularly concerned with the preparation of a satisfactory heavy residuum feed stock for a fluidized catalytic cracking operation wherein insoluble ash constituents which would normally render the catalytic cracking operation inefficient, are removed from these heavy residue.

The temperatures and pressures employed in the atmospheric pressure tower or pipe still may vary appreciably depending upon the particular crude or mixtures of crudes being used as feed and depending upon the particular fractions desired. In general, the top pressures are in range from 1 to 10 lb. per square inch gauge, while top temperatures are in the range from 212° F. to 275° F., while bottom temperatures are in the range from 500° F. to 550° F. A typical operation when processing North Louisiana crude is to maintain a pressure of about 6 lb. per square inch gauge and a top temperature of about 250° F. and a bottoms temperature of about 520° F.

The temperatures maintained in the vacuum tower, as well as pressure, will also vary depending upon the residuum being processed. Broad pressures at the top of tower 34 are in the range from about 1 to 5 inches of mercury absolute, while temperatures vary from 400° F. to 480° F. When processing a residuum from North Louisiana crude, typical pressures and temperatures are 2 inches of mercury absolute at 440° F. temperature.

The temperatures and pressures maintained in the soaking zone, as well as the time of soaking, will vary depending upon the feed stock and the concentration of the ash constituents. The soaking temperature also varies somewhat with the nature and chemical structure of the crude. Generally, temperatures have been between about 550° F. and 770° F. When utilizing a conventional operation, the residuum removed from the bottom of the vacuum tower is in the range from 600° F. to 750° F. Thus, at times it may be desirable to cool the residuum by heat exchange with the fresh crude to the unit or by the utilization of water cooled exchangers. As pointed out heretofore, in this instance the residuum by-passes furnace 56. If a higher soaking temperature is required above that at which the residuum leaves the vacuum tower, the heat may be supplied by further heating in furnace 56 or by the use of a secondary coil 57 in furnace 28. The necessary heat may also be supplied by heating the fresh crude to above the desired temperature and then passing the crude and residuum through a heat exchanger in indirect heat exchange with one another.

When the residuum reaches the desired temperature, it is pumped through a soaking vessel or a multiplicity of soaking zones. The soaking can be accomplished either "in situ" or continuously. If the latter operation is employed, the residuum is continuously pumped into or out of the soaking vessel or vessels. The time of soaking may likewise vary appreciably but is usually between 0.5 to 8 hours. Preferred soaking times are in the range from 2 hours to 5 hours.

The heat soaked material is then filtered as described. Conventional plate and frame presses may be utilized. These filters may comprise a multiplicity of filters wherein some are in operation while others are being cleaned. In accordance with the present invention, a number of filters may be employed for filtering the residuum while the others are being washed with the gas oil fraction as illustrated. It is to be understood that continuous rotary or horizontal type filters may also be employed.

The products removed by the filters are insoluble, metallic compounds and a coke-like deposit. This "coke" is not hard, granular, carbonaceous deposits in the ordinary sense of the word. On the contrary the "coke" will melt at elevated temperatures of about 300° F. but below its flash point. Analyses show that the carbon to hydrogen ratio in the coke is between about 1.3 to 1 and 1.7 to 1. Thus, it would appear that the coke consists of condensed aromatics.

The nature and the volume of the coke or asphaltic material comprises one of the problems of the process. When plate and frame filter presses are utilized for the removal of insoluble ash the frames were soon filled with the asphaltic material and heavy oil. On the other hand, when continuous filters of the rotary or horizontal bed type were employed the asphaltic material tended to "blind" the screen and reduce the filtration rate. Thus, a specific concept of the invention is to utilize one of the gas oil streams by pumping the same through the press in the same direction of flow as the residuum had been flowing. If this be done, filtration of the residuum can be resumed without further cleaning or the taking of the press out of service. Eventually the frames of the presses become filled with material which is insoluble in the gas oil, but the periodic washing of the contents of the frames of the filter with gas oil increases the ratio of the time the filter is used on the filtration operation to the time the filter is down for cleaning.

As pointed out, the primary purpose of the heat soaking is to remove metallic constituents of the residuum. The residuum can then be catalytically cracked without harm to the cracking catalyst, if these metals which are poison to the catalyst are removed. Furthermore, it is very desirable to filter out these undesirable constituents with a minimum loss of residuum. This can be accomplished by the use of a side stream from the pipe still, particularly the gas oil stream. This gas oil stream normally comprises a feed stock to a fluidized catalyst cracking zone. Thus, the cleaned filtered residuum from the filter is combined with the gas oil stream and used as additional cracking feed stock. The metallic compounds are not soluble in the gas oil, whereas, the residuum which would ordinarily remain in the filter frames or on the filter screen is soluble. Thus, it is evident that the gas oil which is pumped through or sprayed over the continuous filter is neither reduced in volume nor contaminated by insoluble constituents on the filter. In actual operation, the removal of residuum products from the filter increases the total volume of feed streams available for catalytic cracking, as well as improving the operation of the filter.

Having described the invention it is claimed:
1. Process for preparing a clean feed stock suitable for catalytic cracking which comprises fractionating a crude oil containing ash-forming constituents into a plurality of distillate fractions including a gas-oil fraction and a bottoms fraction that contains substantially all of the ash-forming constituents, heat soaking the bottoms fraction at a temperature between 550° F. and 770° F. for a period of about ½ to 8 hours to convert the ash-forming constituents to insoluble compounds, passing the heat soaked bottoms fraction through a filter in order to remove the insoluble compounds, flushing the filter surfaces by any asphaltic substances contained in tion in order to eliminate clogging of the surfaces by any asphaltic substances contained in said heat treated bottoms fraction, and combining the gas-oil fraction with the bottoms fraction to provide the desired catalytic cracking feed stock.

2. Process according to claim 1 in which the gas-oil fraction is mixed with the bottoms fraction prior to filtering whereby the asphaltic substances are prevented from clogging the filter.

3. Process according to claim 1 in which the filter surfaces are periodically flushed with the gas-oil fraction while temporarily suspending the filtering operation.

4. Process for preparing a clean feed stock suitable for catalytic cracking which comprises fractionating a crude oil containing ash-forming constituents within a first distillation zone under substantially atmospheric pressure conditions into a first plurality of distillate fractions and a first bottoms fraction containing substantially all of the ash-forming constituents, fractionating said first bottoms fraction within a second distillation zone under sub-atmospheric pressure conditions into a second plurality of distillate fractions including at least one gas-oil fraction and a second bottoms fraction, heat soaking said second bottoms fraction at a temperature between 550° F. and 770° F. for a period of about ½ to 8 hours to convert said ash-forming constituents to insoluble compounds, filtering the insoluble compounds from the heat treated said second bottoms fraction, flushing the filter surface with at least a portion of the gas-oil fraction in order to eliminate clogging of the filter surfaces with any asphaltic substances that may be contained in said heat treated bottoms fraction, and combining the gas-oil fraction with the filtered bottoms fraction to provide the desired catalytic cracking feed stock.

5. Process according to claim 4 in which the first distillation zone is characterized by a top pressure in the range of about 1 to 10 p. s. i. g. and the second distillation zone is characterized by a top pressure in the range of about 1 to 5 inches of mercury absolute.

6. Process according to claim 5 in which the bottoms fraction from the first distillation zone constitutes about 25 to 75 vol. % of the crude oil and the bottoms fraction from the sub-atmospheric distillation zone constitutes about 2 to 35 vol. % of the crude oil.

7. Process according to claim 4 in which the second bottoms fraction is heat soaked for a period of about 2 to 5 hours.

References Cited in the file of this patent

UNITED STATES PATENTS

| Number | Name | Date |
|---|---|---|
| 2,166,176 | Peterkin | July 18, 1939 |
| 2,370,816 | Schonberg | Mar. 6, 1945 |
| 2,378,531 | Becker | June 19, 1945 |
| 2,425,532 | Hemminger | Aug. 12, 1947 |